(12) United States Patent
Kanamori et al.

(10) Patent No.: US 7,201,970 B2
(45) Date of Patent: Apr. 10, 2007

(54) AUTOMOBILE INSULATED WIRE (75) Inventors: Yasuo Kanamori, Susono (JP); Norio Kikuchi, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/512,473

(22) PCT Filed: Apr. 23, 2003

(86) PCT No.: PCT/JP03/05209

§ 371 (c)(1),
(2), (4) Date: Oct. 26, 2004

(87) PCT Pub. No.: WO03/092018

PCT Pub. Date: Nov. 6, 2003

(65) Prior Publication Data

US 2005/0171263 A1    Aug. 4, 2005

(30) Foreign Application Priority Data

Apr. 26, 2002    (JP) .............................. 2002-126133

(51) Int. Cl.
*B32B 24/32*    (2006.01)

(52) U.S. Cl. ...................... 428/523; 428/625; 428/626; 428/516; 428/407; 428/319.9; 525/240; 526/351

(58) Field of Classification Search ................ 428/523, 428/625, 319.9, 626, 516, 407; 525/240; 526/351
See application file for complete search history.

(56) References Cited

U.S. PATENT DOCUMENTS 4,489,195 A    12/1984    Saeda et al.
5,561,185 A *  10/1996    Hashimoto et al. .......... 524/436
6,190,772 B1 * 2/2001    Yamano et al. ............. 428/379
6,239,196 B1   5/2001    Bussi et al.

FOREIGN PATENT DOCUMENTS

| EP | 0 472 946 A2 | 3/1992 |
| EP | 0 527 589 A1 | 8/1993 |
| EP | 1 043 733 A1 * | 10/2000 |
| JP | 2000-26696 A | 1/2000 |
| JP | 2002-167480 A | 6/2002 |
| WO | WO 2004/026957 A1 | 4/2004 |

* cited by examiner

*Primary Examiner*—Robert D. Harlan
(74) *Attorney, Agent, or Firm*—Sughrue Mion, PLLC (57) ABSTRACT

An insulated wire for an automobile coated with an insulating material which is a fire retardant polypropylene-based resin composition,
  wherein the fire retardant polypropylene-based resin composition comprises a polypropylene-based resin and an inorganic fire retardant at a ratio of from 80 to 20% by weight and from 20 to 80% by weight, respectively,
  wherein the ratio $\Lambda(=\lambda/\lambda a)$ of the elongation percentage at a yield point $\lambda$ of the fire retardant polypropylene-based resin in the resin composition to the elongation percentage at a tensile yield point $\lambda a$ of the polypropylene-based resin alone satisfies the following equation (1):

$$\Lambda = 1 - \alpha W \qquad (1)$$

wherein $\alpha$ represents a number of 0.6 or less; and W is the weight fraction of the inorganic fire retardant.

4 Claims, 7 Drawing Sheets

AUTOMOBILE INSULATED WIRE

FIELD OF THE INVENTION

The present invention relates to an insulated wire for an automobile comprising the polypropylene-based fire retardant resin composition as an insulating layer excellent in mechanical properties such as abrasion resistance and tensile properties, flexibility, low-temperature flexing, chemical resistance, heat resistance, etc. which generates no poisonous gases such as halogen-based gas during combustion.

BACKGROUND ART

The recent growing awareness of environmental issue has brought forth a requirement that no poisonous gases such as halogen-based gas be emitted during combustion. Referring to insulated wire for an automobile, it has been practiced to apply a non-halogen-based resin composition having a metal hydrate incorporated in a polyolefin-based resin as an insulating material. However, it is necessary that this non-halogen-based resin composition comprises a large amount of a metal anhydride incorporated therein to have the same fire retardancy as halogenic fire retardant materials. This arrangement results in the deterioration of flexibility, abrasion resistance, low temperature properties and mechanical strength of tensile strength and tensile elongation at break. It has thus been required that the fire retardancy and the mechanical strength of the fire retardant material be well balanced.

To cope with this problem, fire retardant olefinic resin compositions comprising a low crystallinity flexible α-olefinic homopolymer or copolymer and magnesium hydroxide have been proposed as in JP-A-62-167339. This approach is intended to fill the homopolymer or copolymer with magnesium hydroxide in a high packing, thereby producing a composition having a high fire retardancy as well as excellent flexibility, low temperature properties and workability. However, even this composition leaves something to be desired in abrasion resistance and heat resistance and thus is still disadvantageous in practicability.

Further, JP-A-5-239281 proposes an abrasion-resistant fire retardant composition made of a polymer comprising an α-olefin (co)polymer, ethylene (co)copolymer or rubber, an inorganic fire retardant, a carboxylic acid group, etc. However, even this composition exhibits an excellent fire retardancy and flexibility but leaves something to be desired in heat resistance and abrasion resistance because it comprises an ethylene (co)polymer or rubber as an essential component.

Moreover, JP-2000-26696 proposes a fire retardant resin composition comprising a propylene-ethylene block copolymer, a thermoplastic polyolefin-rubber elastomer and a metal hydroxide. However, even this composition leaves something to be desired in abrasion resistance because it comprises a thermoplastic polyolefin-rubber elastomer as an essential component.

The invention has been worked out under these circumstances. An object of the invention is to provide a wire for an automobile comprising an insulating layer made of a polypropylene-based resin composition, wherein a fire retardancy comparable to that of the related halogen-based fire retardant materials is obtained, and the mechanical properties such as abrasion resistance, tensile strength and elongation, flexibility, low-temperature flexing, heat resistance and chemical resistance are improved.

DISCLOSURE OF THE INVENTION

In general, a propylene-based resin composition filled with an inorganic material undergoes exfoliation on the interface of the inorganic material with the polypropylene resin that causes remarkable whitening resulting in the deterioration of tensile break strength, tensile elongation at break and abrasion resistance. It is thought that the exfoliation on the interface becomes maximum at the yield point in the tensile test. It is also thought that the greater the elongation up to the yield point is, the greater is the strength of the interface of the propylene-based resin with the inorganic material and the better can be attained the dispersion of the inorganic material in the propylene-based resin. Consequently, a composition excellent in mechanical properties such as abrasion resistance and tensile properties and whitening resistance can be obtained.

Then, the present inventors made extensive studies. As a result, it was found that a resin composition comprising a polypropylene-based resin having a predetermined elongation and an inorganic fire retardant can accomplish the aforementioned object. The invention has thus been worked out on the basis of this knowledge.

That is, the invention provides an insulated wire for an automobile as follows in order to accomplish the aforementioned object.

(1) An insulated wire for an automobile coated with an insulating material which is a fire retardant polypropylene-based resin composition, wherein the fire retardant polypropylene-based resin composition comprises a polypropylene-based resin and an inorganic fire retardant at a ratio of from 80 to 20% by weight and from 20 to 80% by weight, respectively, wherein the ratio $\Lambda(=\lambda/\lambda a)$ of the elongation percentage at a yield point $\lambda$ of the fire retardant polypropylene-based resin in the resin composition to the elongation percentage at a tensile yield point $\lambda a$ of the polypropylene-based resin alone satisfies the following equation (1):

$$\Lambda = 1 - \alpha W \tag{1}$$

wherein $\alpha$ represents a number of 0.6 or less; and W is the weight fraction of the inorganic fire retardant.

(2) The insulated wire for an automobile according to the above (1), wherein the polypropylene-based resin is a propylene-α-olefin copolymer containing a xylene-soluble content of from 40% by weight to 80% by weight polymerized by a multi-stage polymerization method, wherein the copolymer comprises:

a component (a-1) having a $\eta Xs/\eta Xis$ ratio of 2.5 or less in which the $\eta Xs$ and the $\eta Xis$ are the intrinsic viscosity of a xylene-soluble content (Xs) and the intrinsic viscosity of a xylene-insoluble content (Xis), respectively, each measured with tetralin at 135° C., a component (a-2) of a propylene homopolymer and/or a propylene-α-olefin random copolymer, and a component (a-3) of a propylene homopolymer and/or a propylene-α-olefin copolymer containing a carboxylic acid group or acid anhydride group in an amount of 0.5% by weight or more, wherein the total content of the component (a-1) and the component (a-2) is from 50 to 90% by weight and the content of the component (a-3) is from 10 to 50% by weight.

(3) The insulated wire for an automobile according to the above (1) or (2), wherein the inorganic fire retardant is a metal oxide, metal hydroxide or metal carbonate having an average particle diameter of 20 μm or less.

(4) The insulated wire for an automobile according to the above (1) or (2), wherein the inorganic fire retardant is a magnesium hydroxide or aluminum hydroxide having an average particle diameter of 20 μm or less.

(5) The insulated wire according to any one of the above (1) to (4), which has a low temperature durability of not higher than −40° C.

The term "low temperature durability" as used herein is meant to indicate that when a wire which has been allowed to stand in a low temperature tank kept at −40° C. or lower for 4 hours or more is wound round a mandrel having the same diameter as that of the wire which has been allowed to stand under the same conditions as in the wire by one turn per second, totaling three or more turns, and then returned to room temperature for examination of external appearance, it shows no cracking and undergoes no dielectric breakdown at 1 kV.

Figure 5:
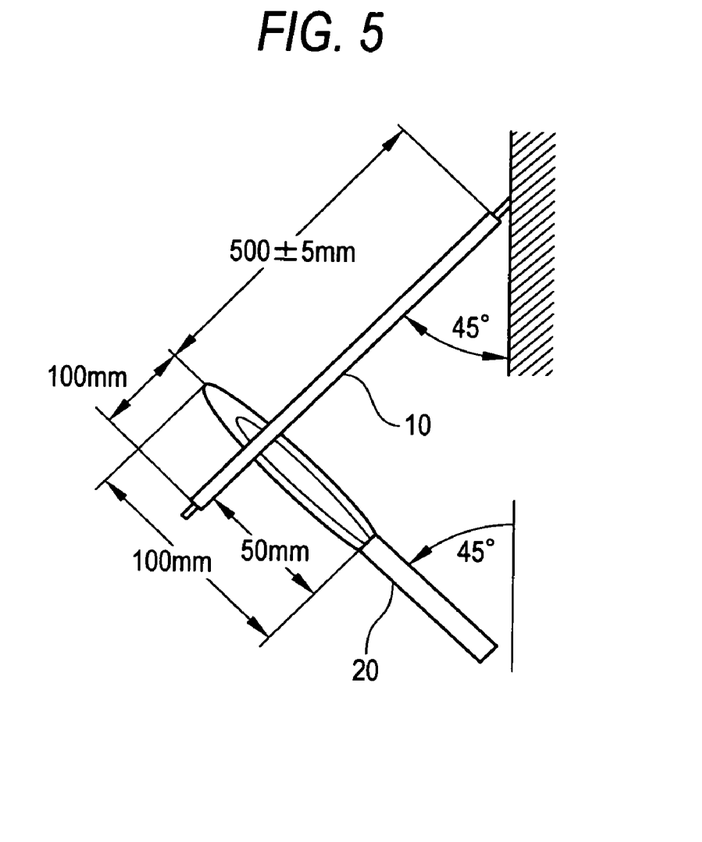
FIG. 5 is a schematic diagram illustrating a method for effecting the fire retardancy test.
Figure 6:
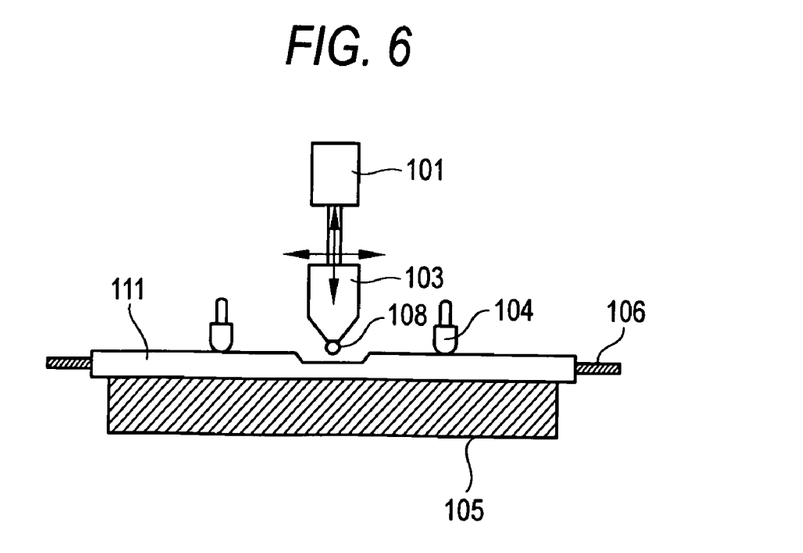
FIG. 6 is a schematic diagram illustrating a method for effecting the scrape abrasion test.

In Figs., sign 10 is a testing wire, sign 20 is a bunsen burner, sign 101 is a pressing member, sign 103 is a plunge, sign 104 is a clamp, sign 105 is a sample holder, sign 106 is a conductor, sign 108 is a piano wire, and sign 111 is a testing wire.

BEST MODE FOR CARRYING OUT THE INVENTION

The invention will be further described hereinafter.

The fire retardant polypropylene-based resin composition of the invention, which is an insulated material of an insulated wire for an automobile, is a resin composition comprising a polypropylene-based resin and an inorganic fire retardant at a ratio of from 80 to 20% by weight and from 20 to 80% by weight, respectively.

Further, the ratio $\Lambda(=\lambda/\lambda a)$ of the elongation percentage at a yield point λ of the polypropylene-based resin in the resin composition to the elongation at a tensile yield point λa of the polypropylene resin alone satisfies the following equation (1):

$$\Lambda = 1 \alpha W \quad (1)$$

wherein α represents a number of 0.6 or less; and W is the weight fraction of the inorganic fire retardant.

The elongation percentage at a tensile yield point λa of the polypropylene resin alone is defined by the equation $\lambda a = (l_1/l_0) \times 100(\%)$ supposing that the point at which the gradient of the load-dislocation curve obtained by measuring a No. 3 dumbbell specimen defined by JIS K 6251 according to JIS K 7113 is zero, the dislocation up to this point is $l_1$ and the initial length of the specimen between the chucks is $l_0$.

The elongation percentage λ at a yield point of the polypropylene-based resin in the fire retardant polypropylene-based resin composition is defined by the equation $\lambda = l_2/[l_0(1-V)] \times 100(\%)$ because the inorganic fire retardant takes no part in elongation and the polypropylene-based resin thus actually undergoes elongation, supposing that the dislocation up to a yield point of the specimen is $l_2$ on the load-dislocation curve obtained by the same tensile test as mentioned above. V is the volume fraction of the inorganic fire retardant, that is, the content (W) of the inorganic fire retardant.

The specimen for the tensile test is obtained by producing a sheet having a thickness of about 0.2 mm at a screw rotary speed of 50 rpm, an extruder dice temperature of 230° C., a cooling roll temperature of 30° C. and a take-off speed of 2.0 m/min using a T-die having a width of 200 mm mounted on a single-screw extruder having a screw diameter of 20 mm, and then punching a dumbbell specimen out of the sheet. Referring to the tensile test conditions, the distance between chucks is 60 mm, the crosshead speed is 200 mm/min, and the temperature is 23° C.

Accordingly, the ratio $\Lambda(=\lambda/\lambda a)$ of the elongation percentage at a yield point. λ of the polypropylene-based resin in the resin composition to the elongation percentage at a tensile yield point % a of the polypropylene resin alone becomes an index of ease of exfoliation on the interface of the inorganic fire retardant with the propylene-based resin.

In some detail, when Λis 1 (λ=λa), the elongation percentage at a yield point of propylene-based resin is substantially the same from the resin alone to the fire retardant polypropylene-based resin composition, demonstrating that no exfoliation occurs on the interface of the polypropylene-based resin with the inorganic fire retardant.

Accordingly, it is thought that the closer to 1 Λis, the greater is the strength of the interface of the polypropylene-based resin with the inorganic fire retardant. Consequently, a fire retardant polypropylene-based resin composition excellent in mechanical strength such as abrasion resistance and tensile properties and whitening resistance can be obtained.

As shown in the equation (1), Λdepends on the content (W) of the inorganic fire retardant as well as on α, and the smaller α is, the smaller is the drop of Λ. In the invention, α is 0.6 or less, preferably 0.55 or less, more preferably 0.5 or less.

As a polypropylene-based resin satisfying these requirements for α there may be used a propylene-α-olefin copolymer containing a xylene-soluble content of from 40% by weight to 80% by weight, preferably from 50% by weight to 70% by weight polymerized by a multi-stage polymerization method comprising a component (a-1) having a ηXs/ηXis ratio of not smaller than 2.5, preferably not smaller than 3.0, more preferably not smaller than 3.3 in which ηXs and ηXis are the intrinsic viscosity of xylene-soluble content (Xs) and xylene-insoluble content (X is) measured with tetralin at 135° C., respectively, a propylene homopolymer and/or propylene-α-olefin random copolymer component (a-2) and a propylene homopolymer and/or propylene-α-olefin copolymer (a-3) containing not smaller than 0.5% by weight of a carboxylic acid group or acid anhydride group wherein the total content of the component (a-1) and the component (a-2) is from 50 to 90% by weight and the content of the component (a-3) is from 10 to 50% by weight.

The xylene-soluble content is measured as follows. Firstly, 2.5 g of the resin is dissolved in 250 ml of 135° C. xylene with stirring. After 20 minutes, the solution is then cooled to 25° C. with stirring. Subsequently, the solution is allowed to undergo sedimentation for 30 minutes. The precipitate is filtered. The filtrate is then evaporated in a stream of nitrogen. The residue is then vacuum-dried at 80° C. until the weight thereof reaches constant. The weight of the residue is then measured to determine the xylene-soluble content at 25° C.

When the xylene-soluble content (Xs) in the component (a-1) falls below 40% by weight, the resulting fire retardant polypropylene-based resin composition exhibits insufficient flexibility and low temperature properties. On the contrary, when the xylene-soluble content (Xs) in the component (a-1) exceeds 80% by weight, the resulting fire retardant polypropylene-based resin composition exhibits a deteriorated mechanical strength. Further, the deterioration of the powder properties of this component causes malhandling during the compounding of the fire retardant polypropylene-based resin composition.

For the measurement of intrinsic viscosity with tetralin, 135° C. tetralin is used each for the xylene-soluble content (Xs) and xylene-insoluble content thus separated. In the invention, when the ratio (ηXs/ηXis) of the intrinsic viscosity (ηXs) of the xylene-soluble content (Xs) to the intrinsic viscosity (ηXis) of the xylene-insoluble content (Xis) measured with 135° C. tetralin falls below 2.5, the resulting fire retardant propylene-based resin composition exhibits a deteriorated abrasion resistance. Further, the intrinsic viscosity (ηXs) of the xylene-soluble content (Xs) is preferably not smaller than 3.0 dl/g similarly from the standpoint of provision of abrasion resistance.

The term "α-olefin" as used herein is meant to indicate a α-olefin having 2 to 12 carbon atoms ($C_2$–$C_{12}$) other than propylene. Examples of these include ethylene, butene-1,4-methylpentene-1, hexene-1 and octene-1, and the like.

Specific examples of the propylene-α-olefin copolymer as component (a-1) include resins produced by the multi-stage polymerization method as disclosed in JP-A-6-25367, but the invention is not limited thereto. This multi-stage polymerization method involves two or more polymerization steps, i.e., step of producing a propylene homopolymer or a crystalline random copolymer of propylene with 5% by weight or less of α-olefin other than propylene and step of producing a random copolymer elastomer of ethylene with one or more α-olefins having three or more carbon atoms. The resin obtained by this multi-stage polymerization method exhibits a good dispersibility as compared with those obtained by mechanically blending the resin components produced separately at various steps because the resin components produced at the various steps are blended in the reactor during polymerization to cause the ethylene-α-olefin random copolymer elastomer component finely dispersed in the crystalline propylene resin.

It is also preferred that an ethylene-α-olefin random copolymer elastomer component (xylene-soluble content) having an average particle diameter of 10 μm or less, preferably from 1 to 5 μm, be uniformly dispersed in the resin obtained by this multi-stage polymerization method, and has a sea-island dispersion structure. It is thus necessary from the standpoint of enhancement of abrasion resistance that an elastomer component having a great molecular weight be dispersed to a fineness of the order of micrometer.

Among ethylene-α-olefin random copolymer elastomer components, an ethylene-propylene random copolymer or ethylene-butene random copolymer is preferred. Further, from the standpoint of low temperature flexing and flexibility of the fire retardant polypropylene-based resin composition, an ethylene-α-olefin random copolymer elastomer component having a low glass transition temperature is desirable.

The ethylene content and/or butene content in the ethylene-α-olefin random copolymer elastomer component is preferably from about 30 to 65% by weight, particularly from 45 to 60% by weight. When the ethylene content and/or butene content falls below 30% by weight or exceeds 65% by weight, the resulting fire retardant polypropylene-based resin composition is disadvantageous in low temperature flexing or flexibility.

The aforementioned component (a-2) is preferably a propylene-α-olefin random copolymer containing a crystalline polypropylene homopolymer and 5% by weight or less of one or more $C_2$–$C_{12}$ α-olefins other than propylene. Examples of such a propylene-α-olefin random copolymer include propylene-ethylene random copolymer, propylene-butene random copolymer, and propylene-butene random copolymer. Commercially available products may be preferably used. Preferred among these propylene-α-olefin random copolymers is polypropylene homopolymer from the standpoint of heat resistance and abrasion resistance.

The aforementioned component (a-3) is preferably an elastomer component-free crystalline polypropoylene such as homopolypropylene and the aforementioned propylene-α-olefin random copolymer, e.g., propylene-ethylene random copolymer, propylene-butene random copolymer and propylene-ethylene-butene ternary copolymer comprising not smaller than 0.5% by weight of carboxylic acid group or acid anhydride group incorporated therein. Examples of the carboxylic acid to be used herein include α,β-unsaturated dicarboxylic acids such as maleic acid, fumaric acid, citraconic acid and itaconic acid, anhydride thereof, and unsaturated monocarboxylic acids such as acrylic acid, methacrylic acid, furoic acid, crotonic acid, vinylacetic acid and pentenic acid. Mostly preferred among these compounds is homopolypropylene having maleic anhydride attached thereto.

The reaction of the propylene homopolymer or propylene-α-olefin random copolymer with the carboxylic acid or anhydride thereof can be carried out by any known method. For example, the propylene homopolymer or propylene-α-olefin random copolymer may be mixed with the carboxylic acid or acid anhydride and a reaction initiator such as organic peroxide, and the mixture may be then melt-kneaded. The amount of the carboxylic acid or acid anhydride to be added to the propylene homopolymer or propylene-α-olefin random copolymer needs to be not smaller than 0.5% by weight. When the amount of carboxylic acid or acid anhydride falls below 0.5% by weight, the resulting fire retardant polypropylene-based resin composition exhibits a drastic deterioration of abrasion resistance and mechanical strength such as tensile break strength and elongation. Thus, in order to provide the fire retardant polypropylene-based resin composition with a sufficient abrasion resistance, the amount of carboxylic acid or acid anhydride group to be added is preferably not smaller than 0.7% by weight.

Referring to the mixing ratio of the component (a-3) to the components (a-1) and (a-2), the amount of the component (a-3) is from 10 to 50% by weight, preferably from 15 to 45% by weight, more preferably from 20 to 40% by weight based on 50 to 90% of the sum of the amount of the components (a-1) and (a-2). In this arrangement of mixing ratio, the fire retardant polypropylene-based resin composition can be provided with an improvement in abrasion resistance and mechanical strength such as tensile break strength and elongation.

When the amount of the component (a-3) is less than 10% by weight, the fire retardant polypropylene-based resin composition cannot be sufficiently provided with abrasion resistance and mechanical strength such as tensile break strength and elongation. On the contrary, when the amount of the component (a-3) exceeds 50% by weight, the resulting fire retardant polypropylene-based resin composition exhibits a remarkably deteriorated fluidity that impairs moldability thereof.

In particular, the fire retardant polypropylene-based resin composition containing an inorganic fire retardant in an amount of not smaller than 40% by weight preferably comprises the component (a-3) incorporated therein in an amount of from 20 to 40% by weight to attain both desired abrasion resistance or mechanical strength such as tensile break strength and elongation and desired fluidity.

By properly arranging the mixing ratio of the component (a-1) and the component (a-2), the flexibility or low temperature flexing of the fire retardant polypropylene-based resin composition can be adjusted. When the component (a-1) is used as a main component, a better flexibility or low temperature flexing can be obtained.

On the other hand, as the inorganic fire retardant to be packed in the aforementioned polypropylene-based resin, there may be used any of oxide, hydroxide and carbonate of various metals such as magnesium, aluminum, calcium, potassium and zinc. The average particle diameter of these inorganic fire retardants is preferably 20 μm or less. Among these inorganic fire retardants, magnesium hydroxide or aluminum hydroxide having an average particle diameter of 20 μm or less, preferably 10 μm or less is preferably used taking into account fire retardancy and economy. Further, in order to inhibit its agglomeration or enhance its dispersibility with a resin component, these inorganic fire retardants are subjected to surface treatment with an aliphatic acid such as stearic acid, oleic acid and palmitic acid, metal salt thereof, wax, organic titanate or organic silane.

The content of the inorganic fire retardant is from 20 to 80% by weight of the amount of the fire retardant polypropylene-based resin composition. The amount of the inorganic fire retardant to be incorporated in the fire retardant polypropylene-based resin composition can vary with the fire retardancy of the final use required.

When the content of the inorganic fire retardant is less than 20% by weight, the resulting polypropylene-based resin exhibits an insufficient fire retardancy. On the contrary, when the content of the inorganic fire retardant exceeds 80% by weight, the resulting fire retardant polypropylene-based resin composition becomes too hard for practical use. In particular, when the fire retardant polypropylene-based resin composition comprises an inorganic fire retardant incorporated therein in a packing as high as from 40 to 65% by weight, the effect of the invention can be exerted more effectively. When the content of the inorganic fire retardant in the fire retardant polypropylene-based resin composition is from 50 to 60% by weight, the effect of the invention can be exerted most effectively.

The method for obtaining the fire retardant polypropylene-based resin composition of the invention is not specifically limited. In practice, however, a method may be employed which comprises pre-blending a propylene-based resin and an inorganic fire retardant using a high speed mixing machine such as Henschel mixer, and then kneading the blend using a known kneading machine such as single-screw extruder, twin-screw extruder, Banbury mixer, kneader and roll mill.

The fire retardant polypropylene-based resin composition of the invention may comprise various commonly used auxiliaries such as oxidation inhibitor, e.g., phenolic oxidation inhibitor, phosphorus-based oxidation inhibitor and sulfur-based oxidation inhibitor, coloring agent, nucleating agent, antistat, metal salt of aliphatic acid, lubricant, e.g., amide-based lubricant, silicon-based lubricant and teflon-based lubricant, slip agent, working assistant, metal deactivator and ultraviolet inhibitor incorporated therein so far as the effect of the invention is not impaired.

Figure 1:
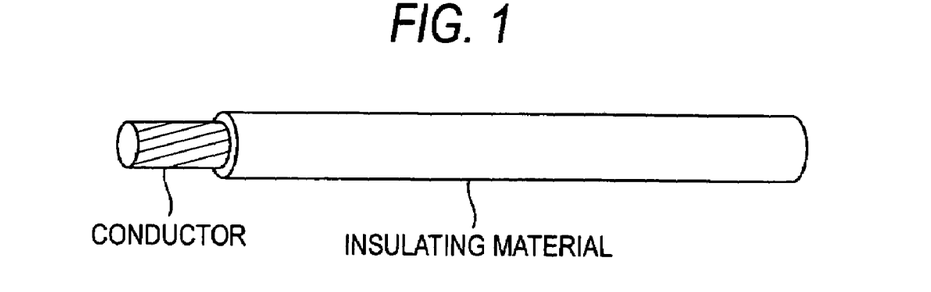
FIG. 1 is a perspective view illustrating an embodiment (single wire) of the wire for an automobile according to the invention.
Figure 2:
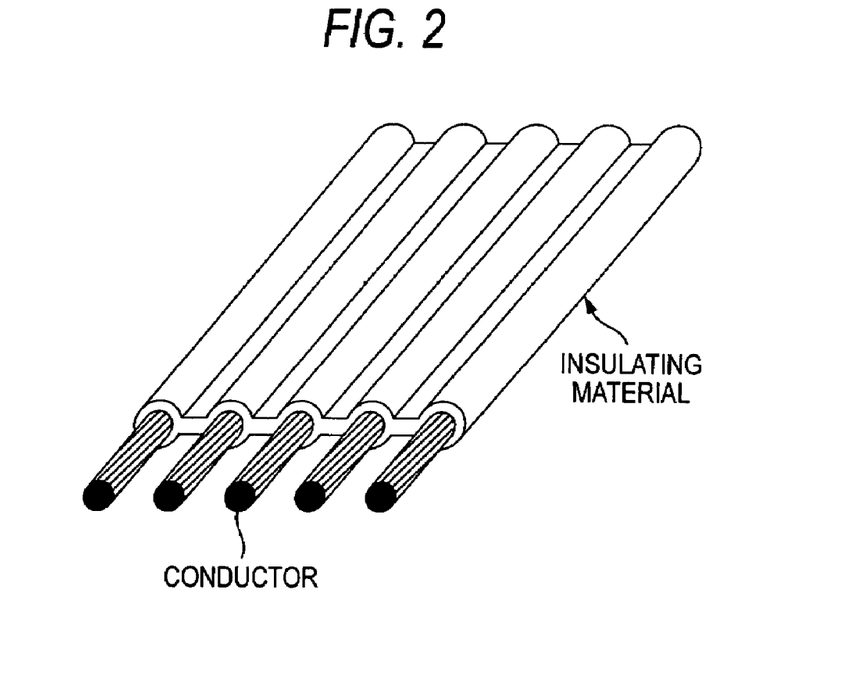
FIG. 2 is a perspective view illustrating another embodiment (flat wire) of the wire for an automobile according to the invention.
Figure 3:
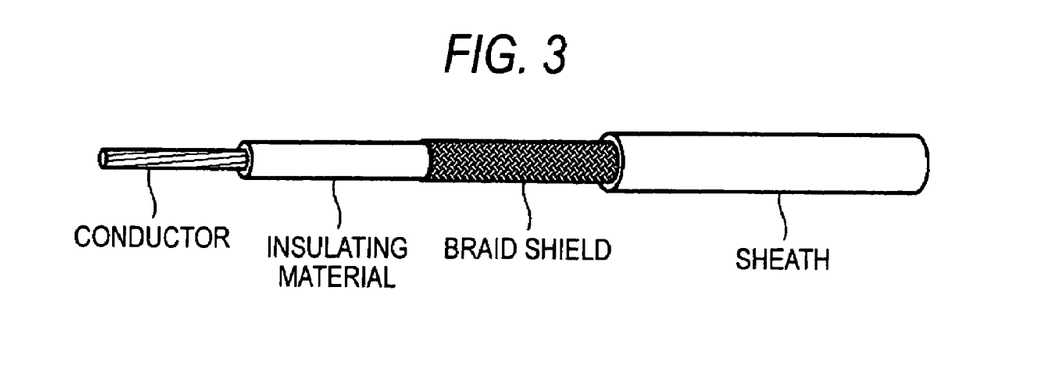
FIG. 3 is a perspective view illustrating a further embodiment (shielded wire) of the wire for an automobile according to the invention.

In the present invention, the kind and structure of the insulated wire for an automobile are not limited. By using the aforementioned fire retardant polypropylene-based resin composition as the insulating material for the single wire shown in FIG. 1, the flat wire shown in FIG. 2, the shielded wire shown in FIG. 3, improvements particularly in abrasion resistance and low temperature durability can be attained while maintaining sufficient insulation characteristics and fire retardancy.

The method for applying the fire retardant polypropylene-based resin composition of the invention to a wire as an insulating material is not limited. Various known methods can be employed. For example, as an extruder there may be used a single-screw extruder having a cylinder diameter φ of from 20 to. 90 mm and L/D of from 10 to 40 having a screw, a crosshead, a breaker plate, a distributor, a nipple and a dice. The fire retardant polypropylene-based resin composition is charged into a single-screw extruder the temperature of which has been predetermined to a temperature at which the aforementioned fire retardant polypropylene-based resin composition can be thoroughly melted. The fire retardant polypropylene-based resin composition is melted and kneaded by the screw. A predetermined amount of the fire retardant polypropylene-based resin composition thus kneaded is then supplied into the crosshead via the breaker plate. The fire retardant polypropylene-based resin composition thus melted is then flown onto the periphery of the nipple through the distributor. The molten fire retardant polypropylene-based resin composition which has been thus supplied is then extruded covering the periphery of a conductor by the dice to obtain a wire provided with an insulating material.

EXAMPLES

The invention will be further described in the following examples, but the invention is not limited thereto.

The formulation and physical properties of components (a-1), (a-2) and (a-3) and inorganic fire retardants used in the examples and comparative examples will be described below.

Component (a-1):

Multi-stage polymerization processes were effected using a 100l autoclave under the same conditions of catalyst system and polymerization according to the method described in JP-A-57-61012 so that a homopolypropylene and an ethylene-propylene random copolymer were produced at the first and second polymerization stages, respectively. As a result, two multi-stage polymerization process polypropylene copolymers (1) and (2) were prepared as shown in Table 1.

TABLE 1

|  | Multi-stage polymerization process polypropylene (1) | Multi-stage polymerization process polypropylene (2) |
| --- | --- | --- |
| MFR (g/10 min) | 2.5 | 0.8 |
| Xylene-soluble content Xs (wt %) | 55 | 60 |
| Intrinsic viscosity of xylene-soluble content | 3.5 | 2.9 |
| Xylene-insoluble content Xis (wt %) | 45 | 40 |
| Intrinsic viscosity ratio (ηXs/ηXis) | 3.3 | 2.4 |

The xylene-soluble content (Xs) and xylene-insoluble content (X is) were measured as follows. Firstly, 2.5 g of the resin was dissolved in 250 ml of 135° C. xylene. After 20 minutes, the solution was then cooled to 25° C. with stirring. Subsequently, the solution was allowed to undergo sedimentation for 30 minutes. The precipitate was then filtered. The filtrate was then evaporated in a stream of nitrogen. The residue was then vacuum-dried at 80° C. until the weight thereof reached constant. The weight of the residue was then measured to determine the xylene-soluble content (As) at 25° C.

Component (a-2):

Homopolypropylene PS201A (MFR: 0.5 g/10 min), produced by Sun Allomer Co., Ltd., was prepared.

Component (a-3):

To a homopropylene having MFR of 0.5 g/10 min was added maleic anhydride in a content described below. To the mixture was then blended with an organic peroxide. The blend was then melt-blended in a single-screw extruder to prepare the following two acid-modified polypropylenes (1) and (2).

Acid-modified polypropylene (1): Maleic anhydride content: 0.8% by weight; MFR: 90 g/10 min Acid-modified polypropylene (2): Maleic anhydride content: 0.3% by weight; MFR: 30 g/10 min For comparison, as resins corresponding to the mixture of the components (a-1) and (a-2) there were prepared a block polypropylene (having physical properties as set forth in Table 2) having a xylene-soluble content of 20% by weight obtained by polymerization in a reactor and EPR ("Toughmer P-0280" (MFR: 2.9 g/10 min), produced by Mitsui Petrochemical Co., Ltd.).

TABLE 2

|  | Block polypropylene |
| --- | --- |
| MFR (g/10 min) | 1.2 |
| Xylene-soluble content Xs (wt- %) | 20 |

TABLE 2-continued

|  | Block polypropylene |
| --- | --- |
| Intrinsic viscosity of xylene-soluble content | 4.0 |
| Xylene-insoluble content Xis (wt- %) | 80 |
| Intrinsic viscosity ratio (ηXs/ηXis) | 3.7 |

Inorganic Fire Retardant:

Magnesium hydroxide: KISUMA SA (average particle diameter: about 0.8 μm), produced by Kyowa Chemical Industry Co., Ltd.

(Evaluation of Properties of Materials)

The aforementioned various components were blended as set forth in Tables 3, 4, 5 and 6 to prepare testing fire retardant polypropylene-based resin compositions which were each subjected to processing by a Henschel mixer having a capacity of 20 litter, and then kneaded using a co-rotating twin-screw extruder having a diameter ϕ of 40 mm at a dice temperature of 200° C. to prepare pelletized materials. Thereafter, these pelletized materials were each extruded through a T-die having a width of 200 mm mounted on the forward end of an extruder having a diameter ϕ of 20 mm at a molding temperature of 230° C. and a take-off speed of 2.0 m/min to prepare sheets having a thickness of 0.2 mm. The sheets thus obtained were each then subjected to various physical property tests such as tensile test, abrasion resistance test and LOI (limiting oxygen index) test.

<Tensile Test>

As test specimens, JIS K6251 No. 3 dumbbell specimens were punched out of the various sheets. These test specimens were each then subjected to tensile test at ordinary temperature, a pulling rate of 200 mm/min, a distance of 60 mm between chucks and a distance $L_0$ of 20 mm between two gage marks. The tensile strength was determined by dividing the strength of the test specimen at break by the minimum section area. The tensile elongation was determined from the distance (L) between two gage marks at break as $[(L-L_0)/L_0] \times 100$.

Figure 4:
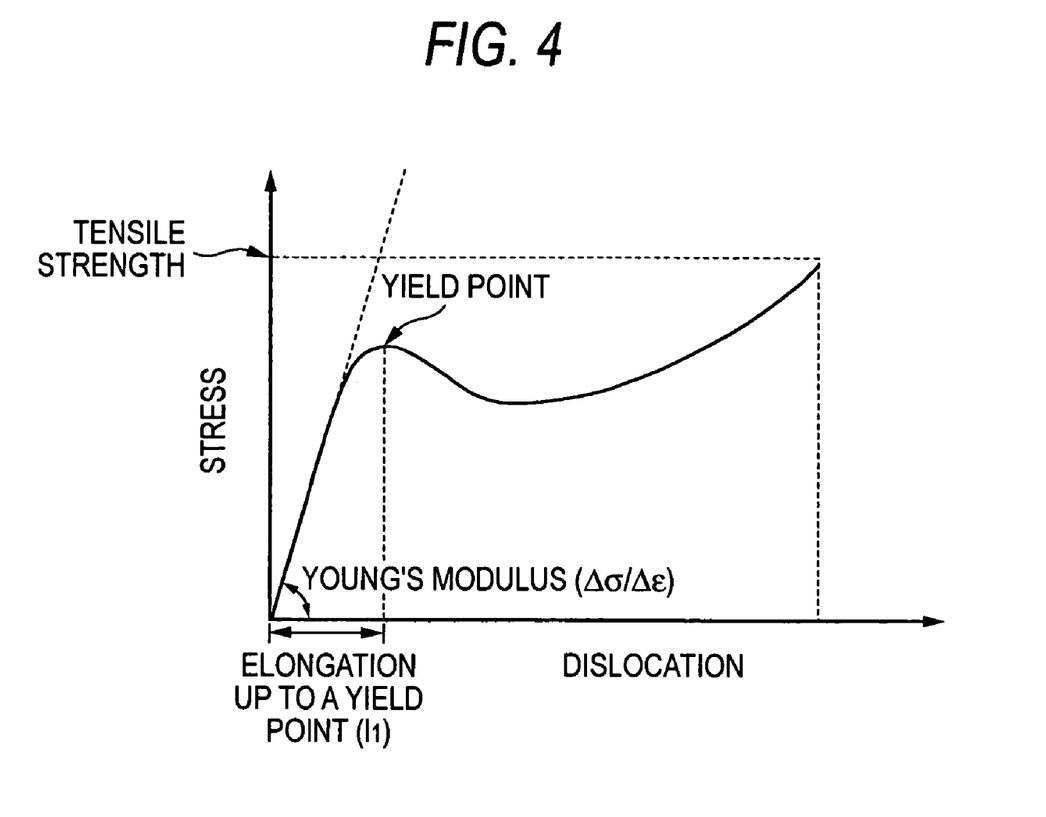
FIG. 4 is a diagram illustrating an example of the dislocation-stress curve obtained by the tensile test and how to determine the elongation at yield and Young's modulus.

The young modulus (E) was determined from $E=\Delta\sigma/\Delta\epsilon$ (Δσ: difference in stress by average section area between two points on the tangential line, Δε: difference in strain between the two points) obtained by drawing a tangential line on the initial linear area of load in the dislocation-stress curve (FIG. 4) obtained in the aforementioned tensile test.

The elongation ($l_1$) up to a yield point was read from the dislocation-stress curve (FIG. 4) obtained in the aforementioned tensile test. The elongation percentage up to a yield point ($l_1/l_0$)×100 (in which $L_0$ is the distance between chucks). The results were then corrected by the content (weight fraction) of magnesium hydroxide to calculate the elongation (λ) of the test specimen up to a yield point of polypropylene-based resin. A test specimen which had been separately prepared from a resin component alone was then subjected to tensile test in the same manner as mentioned above to determine the elongation (λa) up to a yield point. Λ(=λ/λa) was then determined from the two elongations.

<Abrasion Resistance>

The test specimen was subjected to abrasion test at a load of 3 N using a piano wire having a diameter ϕ of 0.45 mm as a blade according to the blade reciprocation method defined in JASO D611-12-(2). In some detail, the sheets were each wound round and firmly fixed to a metal rod having a diameter ϕ of 1.4 mm. The number of reciprocations made until the blade came in contact with the metal rod was then measured at 20 points per sample. These measurements were then averaged to determine abrasion resistance.

<LOI (Limiting Oxygen Index)>

The aforementioned pelletized materials were each processed under a 230° C. press (pre-heated for 3 minutes, pressed for 1 minute) to prepare sheets having a thickness of 3 mm. An A-1 sample defined in JIS K7201 was then cut out of these sheets. These samples were each then measured according to JIS K7201.

(Evaluation of Properties of Wire)

As set forth in Tables 5 and 6, the testing wires of Examples 2, 5, 7, 8, 9 and 10 and Comparative Examples 2, 5, 8 and 10 were prepared from the same testing fire retardant polypropylene-based resin compositions. The weight fraction of magnesium hydroxide in these testing wires were all 50% by weight, which is the packing density necessary for fire retardancy of actual insulated wire for an automobile. In some detail, the various testing fire retardant polypropylene-based resin compositions were each charged into a wire extruder (φ: 60 mm; L/D: 24.5; FF screw) where it was then extruded onto a conductor having an area of 0.3395 mm$^2$ (wire formed by twisting 7 filaments having a diameter of 0.2485 mm) at an extrusion speed of 600 mm/min and an extrusion temperature of 230° C. to prepare an insulated wire having a finished outer diameter of 1.20 mm.

The various testing wires were each then subjected to the following abrasion resistance test, LOI (limiting oxygen index) test, tensile test and low temperature durability test. The results of these tests are set forth in Tables 5 and 6.

<Tensile Test>

The testing wire having a length of about 150 mm was provided with gage marks at a regular interval of 50 mm in the central part thereof. The testing wire was then attached to the chucks of a testing machine defined in JIS B7721. The testing wire was then pulled at a pulling rate of from 25 to 500 mm/min. The tensile elongation was determined from the length of the testing wire at the maximum tensile load and at break.

<Fire Retardancy>

As shown in FIG. 5, a testing wire 10 having a length of 600 mm or more was fixed at an inclination angle of 45° in a windless tank. A reducing flame from a Bunsen burner 20 was then applied to the portion of the testing wire positioned at 500 mm±5 mm from the upper end thereof for 15 seconds. The time required until extinction was then measured.

<Abrasion Resistance>

For the abrasion resistance test, a scrape abrasion testing machine shown in FIG. 6 was used. In some detail, a testing wire 111 having a length of about 1 m was placed on a sample holder 105 to which it was then fixed by a clamp 104. A plunge 103 provided with a piano wire 108 at the forward end thereof was then pressed against the testing wire 111 at a total load of 7 N using a pressing member 101 while moving back and forth (over a range of 14 mm). The number of reciprocations made until the insulating material on the testing wire 111 was worn to an extend such that the piano wire 108 of the plunge 103 came in contact with the conductor 106 of the testing wire 111 was then measured.

<Low Temperature Durability>

The testing wire having a length of about 600 mm having its insulating material stripped off over 25 mm at both ends thereof and a mandrel having the same diameter as that of the testing wire were allowed to stand in a low temperature tank the temperature of which had been kept at a predetermined value for 4 hours or more. The testing wire was wound round the mandrel by one turn per second, totaling three turns or more, and then returned to room temperature for examination of external appearance. The testing wire was then visually examined for occurrence of cracking. The testing wire showing no cracking was further subjected to dielectric breakdown test at 1 kV. The same procedure was effected at various temperatures. Thus, critical temperature at which the testing wire undergoes no cracking or dielectric breakdown was determined.

The results of the aforementioned evaluation of properties of materials and wires are set forth in Tables 3 to 6.

TABLE 3

| | | Unit | Example 1 | Example 2 | Example 3 | Example 4 | Example 5 | Example 6 |
|---|---|---|---|---|---|---|---|---|
| (a-1) Multi-stage polymerization process PP copolymer (1) | | wt % | 23.5 | 18.5 | 11 | | | |
| (a-1) Multi-stage polymerization process PP copolymer (2) | | wt % | | | | 23.5 | 18.5 | 11 |
| (a-2) PP | | wt % | 23.5 | 18.5 | 11 | 23.5 | 18.5 | 11 |
| (a-3) Acid-modified PP (1) | | wt % | 13 | 13 | 13 | 13 | 13 | 13 |
| Mg(OH)$_2$ | | wt % | 40 | 50 | 65 | 40 | 50 | 65 |
| Total | | wt % | 100 | 100 | 100 | 100 | 100 | 100 |
| Properties of material | Λ = 1 − 0.6 W | — | 0.76 | 0.7 | 0.61 | 0.76 | 0.70 | 0.61 |
| | Measured λa | % | 6.5 | 4.7 | 3.8 | 11.0 | 8.2 | 5.3 |
| | Measured λ | % | 5.5 | 3.8 | 2.9 | 10.5 | 7.6 | 4.8 |
| | Measured Λ | — | 0.85 | 0.81 | 0.75 | 0.95 | 0.93 | 0.9 |
| | Xylene-soluble content of (a-1) | wt % | 55 | 55 | 55 | 60 | 60 | 60 |
| | Intrinsic viscosity ratio (ηXs/ηXis) of (a-1) | — | 3.3 | 3.3 | 3.3 | 2.4 | 2.4 | 2.4 |

TABLE 3-continued

|  |  | Unit | Example 1 | Example 2 | Example 3 | Example 4 | Example 5 | Example 6 |
|---|---|---|---|---|---|---|---|---|
| | Acid content of (a-3) | wt % | 0.8 | 0.8 | 0.8 | 0.8 | 0.8 | 0.8 |
| Physical properties of material | Abrasion resistance | Turns | 580 | 440 | 280 | 400 | 300 | 220 |
| | Young modulus | MPa | 1,100 | 1,400 | 1,800 | 900 | 1,200 | 1,600 |
| | LOI | % | 24 | 27 | 32 | 24 | 27 | 32 |
| | Tensile strength | MPa | 35 | 26 | 25 | 33 | 25 | 25 |
| | Tensile elongation | % | 550 | 300 | 150 | 700 | 350 | 250 |

TABLE 4

|  |  | Unit | Comparative Examples | | | | | | | | |
|---|---|---|---|---|---|---|---|---|---|---|---|
|  |  |  | 1 | 2 | 3 | 4 | 5 | 6 | 7 | 8 | 9 |
| (a-1) Multi-stage polymerization process PP copolymer (1) | | wt % |  |  |  |  |  |  | 23.5 | 18.5 | 11 |
| (a-1) Multi-stage polymerization process PP copolymer (2) | | wt % |  |  |  |  |  |  |  |  |  |
| (a-1) + (a-2) Block-PP | | wt % | 47 | 37 | 22 |  |  |  |  |  |  |
| (a-1) EPR | | wt % |  |  |  | 23.5 | 18.5 | 11 |  |  |  |
| (a-2) PP | | wt % |  |  |  | 23.5 | 18.5 | 11 | 23.5 | 18.5 | 11 |
| (a-3) Acid-modified PP (1) | | wt % | 13 | 13 | 13 | 13 | 13 | 13 |  |  |  |
| (a-3) Acid-modified PP (2) | | wt % |  |  |  |  |  |  | 13 | 13 | 13 |
| Mg(OH)$_2$ | | wt % | 40 | 50 | 65 | 40 | 50 | 65 | 40 | 50 | 65 |
| Total | | wt % | 100 | 100 | 100 | 100 | 100 | 100 | 100 | 100 | 100 |
| Properties of material | Λ = 1 − 0.6 W | — | 0.76 | 0.7 | 0.61 | 0.76 | 0.7 | 0.61 | 0.76 | 0.7 | 0.61 |
| | Measured λa | % | 6.0 | 4.5 | 3.2 | 11.8 | 8.9 | 5.6 | 6.6 | 4.8 | 4.1 |
| | Measured λ | % | 3.9 | 2.5 | 1.2 | 8.1 | 5.3 | 2.5 | 4.6 | 3.0 | 2.1 |
| | Measured Λ | — | 0.65 | 0.55 | 0.39 | 0.69 | 0.6 | 0.45 | 0.7 | 0.63 | 0.51 |
| | Xylene-soluble content of (a-1) | wt % | 20 | 20 | 20 | 100 | 100 | 100 | 100 | 55 | 100 |
| | Intrinsic viscosity ratio ($\eta$Xs/$\eta$Xis) of (a-1) | — | 3.7 | 3.7 | 3.7 | — | — | — | 3.3 | 3.3 | 3.3 |
| | Acid content of (a-3) | wt % | 0.8 | 0.8 | 0.8 | 0.8 | 0.8 | 0.8 | 0.8 | 0.2 | 0.8 |
| Physical properties of material | Abrasion resistance | Turns | 280 | 220 | 150 | 110 | 75 | 65 | 210 | 180 | 120 |
| | Young modulus | MPa | 1,300 | 1,650 | 2,000 | 850 | 1,150 | 1,500 | 1,100 | 1,400 | 1,800 |
| | LOI | % | 24 | 27 | 32 | 24 | 27 | 32 | 24 | 27 | 32 |
| | Tensile strength | MPa | 38 | 28 | 24 | 28 | 14 | 13 | 33 | 25 | 24 |
| | Tensile elongation | % | 400 | 190 | 100 | 700 | 340 | 280 | 420 | 200 | 120 |

TABLE 5

|  | Unit | Example 7 | Example 2 | Example 8 | Example 5 | Example 9 | Example 10 |
|---|---|---|---|---|---|---|---|
| (a-1) Multi-stage polymerization process PP copolymer (1) | wt % | 27 | 18.5 | 15 |  |  |  |

TABLE 5-continued

|  | | Unit | Example 7 | Example 2 | Example 8 | Example 5 | Example 9 | Example 10 |
|---|---|---|---|---|---|---|---|---|
| (a-1) Multi-stage polymerization process PP copolymer (2) | | wt % | | | | 18.5 | 15 | 12 |
| (a-2) PP | | wt % | 10 | 18.5 | 22 | 18.5 | 12 | 25 |
| (a-3) Acid-modified PP (1) | | wt % | 13 | 13 | 13 | 13 | 13 | 13 |
| Mg(OH)$_2$ | | wt % | 50 | 50 | 50 | 50 | 50 | 50 |
| Total | | wt % | 100 | 100 | 100 | 100 | 100 | 100 |
| Properties of material | Λ = 1 − 0.6 W | — | 0.7 | 0.7 | 0.7 | 0.7 | 0.7 | 0.7 |
|  | Measured λa | % | 8.5 | 4.7 | 3.1 | 8.2 | 5.6 | 4.4 |
|  | Measured λ | % | 7.2 | 3.8 | 2.3 | 7.5 | 5.0 | 3.6 |
|  | Measured Λ | — | 0.85 | 0.81 | 0.75 | 0.93 | 0.89 | 0.82 |
|  | Xylene-soluble content of (a-1) | wt % | 55 | 55 | 55 | 60 | 60 | 60 |
|  | Intrinsic viscosity ratio (ηXs/ηXis) of (a-1) | — | 3.3 | 3.3 | 3.3 | 2.4 | 2.4 | 2.4 |
|  | Acid content of (a-3) | wt % | 0.8 | 0.8 | 0.8 | 0.8 | 0.8 | 0.8 |
| Physical properties of material | Abrasion resistance | Turns | 170 | 440 | 1,100 | 300 | 640 | 950 |
|  | Young modulus | MPa | 1,100 | 1,400 | 1,700 | 1,200 | 1,500 | 1,800 |
|  | LOI | % | 27 | 27 | 27 | 27 | 27 | 27 |
|  | Tensile strength | MPa | 23 | 26 | 27 | 25 | 26 | 27 |
|  | Tensile elongation | % | 410 | 300 | 180 | 350 | 280 | 200 |
| Physical properties of wire | Abrasion resistance | Turns | 120 | 240 | 570 | 110 | 190 | 300 |
|  | Tensile strength | MPa | 21 | 25 | 27 | 24 | 26 | 27 |
|  | Tensile elongation | % | 340 | 310 | 330 | 400 | 330 | 300 |
|  | Fire retardancy | sec. | 30 | 30 | 38 | 26 | 29 | 30 |
|  | Low temperature durability | ° C. | −65 | −55 | −45 | −55 | −45 | −40 |

TABLE 6

|  | | Unit | Comparative Example 2 | Comparative Example 5 | Comparative Example 8 | Comparative Example 10 |
|---|---|---|---|---|---|---|
| (a-1) Multi-stage polymerization process PP copolymer (1) | | wt % | | | 18.5 | 18.5 |
| (a-1) Multi-stage polymerization process PP copolymer (2) | | wt % | | | | |
| (a-1) + (a-2) Block-PP | | wt % | 37 | | | |
| (a-1) EPR | | wt % | | 18.5 | | |
| (a-2) PP | | wt % | | 18.5 | 18.5 | 28.5 |
| (a-3) Acid-modified PP (1) | | wt % | 13 | 13 | | 3 |
| (a-3) Acid-modified PP (2) | | wt % | | | 13 | |
| Mg(OH)$_2$ | | wt % | 50 | 50 | 50 | 50 |
| Total | | wt % | 100 | 100 | 100 | 100 |
| Properties of material | Λ = 1 − 0.6 W | — | 0.7 | 0.7 | 0.7 | 0.7 |
|  | Measured λa | % | 4.5 | 7.9 | 4.8 | 4.6 |
|  | Measured λ | % | 2.475 | 4.7 | 3.0 | 2.3 |
|  | Measured Λ | — | 0.55 | 0.6 | 0.63 | 0.51 |
|  | Xylene-soluble content of (a-1) | wt % | 20 | 100 | 55 | 55 |
|  | Intrinsic viscosity ratio (ηXs/ηXis) of (a-1) | — | 3.7 | — | 3.3 | 3.3 |

TABLE 6-continued

|  |  | Unit | Comparative Example 2 | Comparative Example 5 | Comparative Example 8 | Comparative Example 10 |
|---|---|---|---|---|---|---|
|  | Acid content of (a-3) | wt % | 0.8 | 0.8 | 0.2 | 0.8 |
| Physical properties of material | Abrasion resistance | Turns | 220 | 75 | 180 | 110 |
|  | Young modulus | MPa | 1,650 | 1,150 | 1,400 | 1,450 |
|  | LOI | % | 27 | 27 | 27 | 27 |
|  | Tensile strength | MPa | 28 | 14 | 25 | 25 |
|  | Tensile elongation | % | 190 | 340 | 200 | 250 |
| Physical properties of wire | Abrasion resistance | Turns | 210 | 50 | 90 | 70 |
|  | Tensile strength | MPa | 25 | 18 | 25 | 22 |
|  | Tensile elongation | % | 260 | 300 | 250 | 200 |
|  | Fire retardancy | sec. | 40 | 35 | 28 | 45 |
|  | Low temperature durability | ° C. | −25 | −65 | −40 | −40 |

Figure 7:
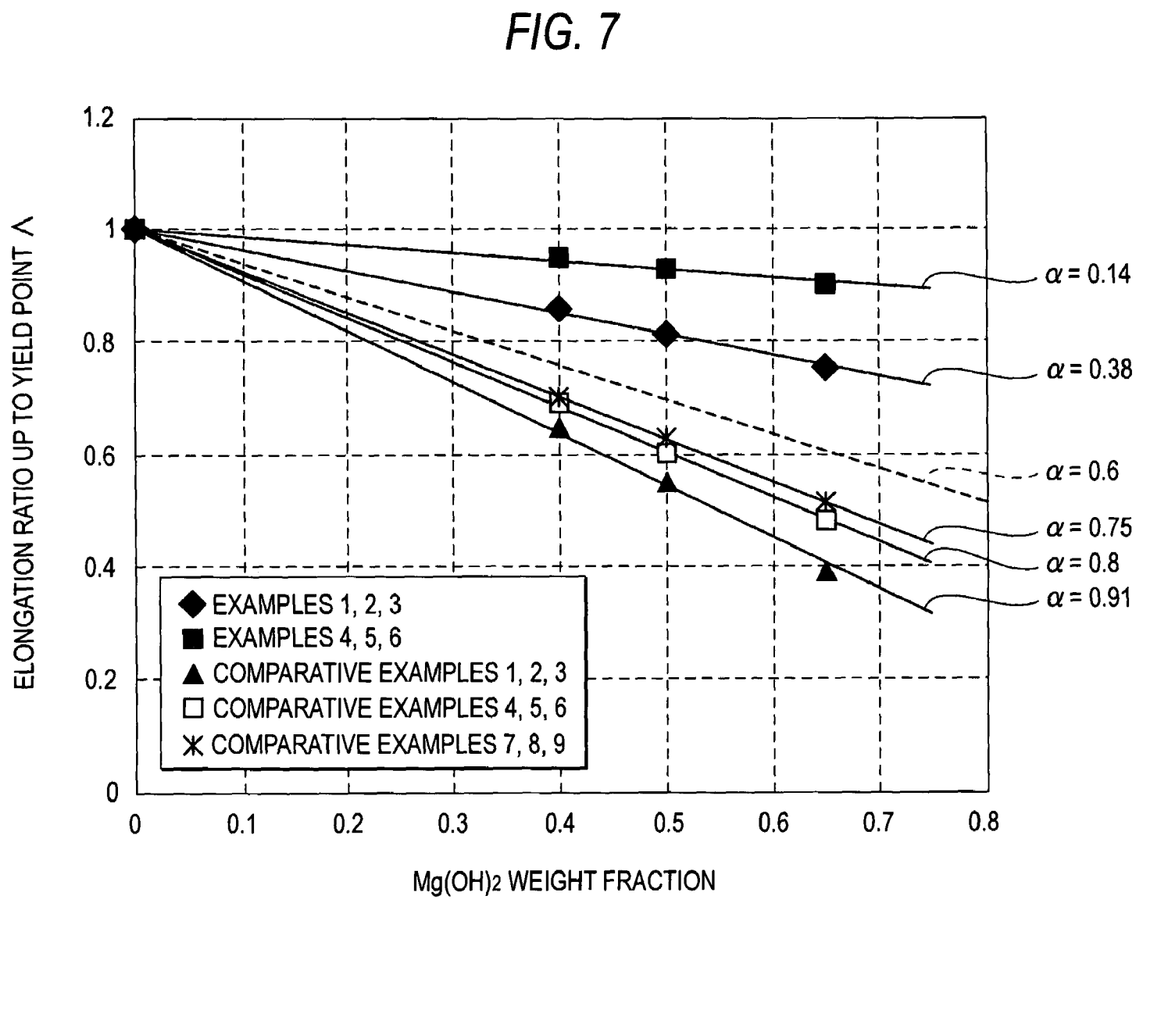
FIG. 7 is a graph illustrating the relationship between magnesium hydroxide weight fraction and Λvalue of fire retardant polypropylene-based resin compositions obtained in the examples and comparative examples.

FIG. 7 is a graph obtained by plotting the Λvalue vs. the weight fraction of magnesium hydroxide of Examples 1 to 6 and Comparative Examples 1 to 9. The results show that all the examples show a Λvalue that decreases with the rise of magnesium hydroxide content as a substantially linear function. The gradient of the various straight lines corresponds to α. The upper two straight lines obtained in Examples 1 to 6 have α of 0.14 and 0.38, respectively, both of which satisfy the equation (1): Λ=1−αW (α is 0.6 or less).

On the contrary, the lower three straight lines obtained in Comparative Examples 1 to 9 have α of 0.75, 0.8 and 0.91, respectively, none of which satisfies the equation (1).

Figure 8:
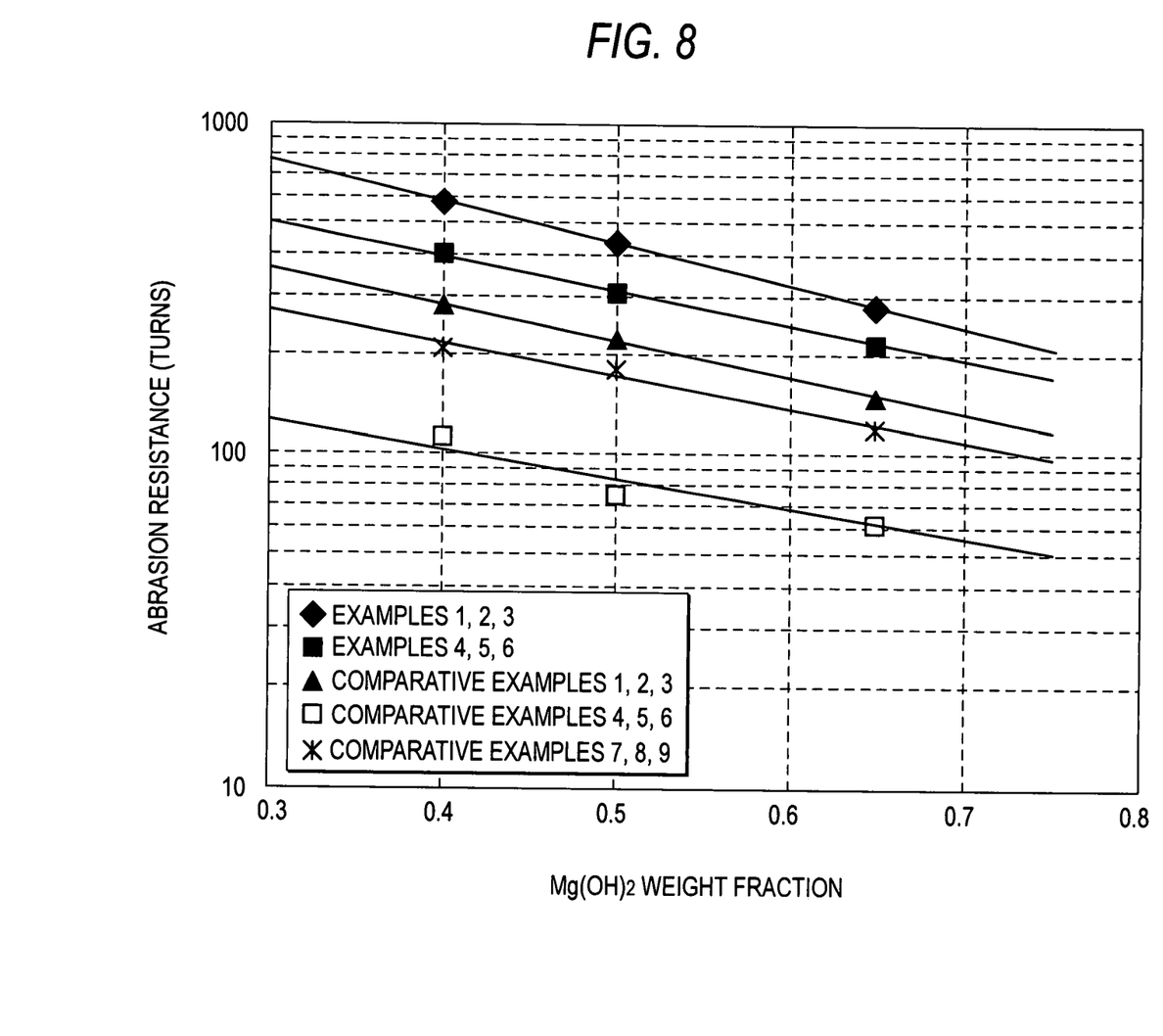
FIG. 8 is a graph illustrating the relationship between magnesium hydroxide weight fraction and abrasion resistance of fire retardant polypropylene-based resin compositions obtained in the examples and comparative examples.

FIG. 8 is a graph obtained by plotting the abrasion resistance vs. the weight fraction of magnesium hydroxide of Examples 1 to 6 and Comparative Examples 1 to 9. The results show that all the examples and comparative examples show abrasion resistance that decreases exponentially with the rise of magnesium hydroxide content.

Accordingly, it can be seen in FIGS. 7 and 8 that when the equation (1) is satisfied, a fire retardant polypropylene-based resin composition having an excellent abrasion resistance can be obtained.

Figure 9:
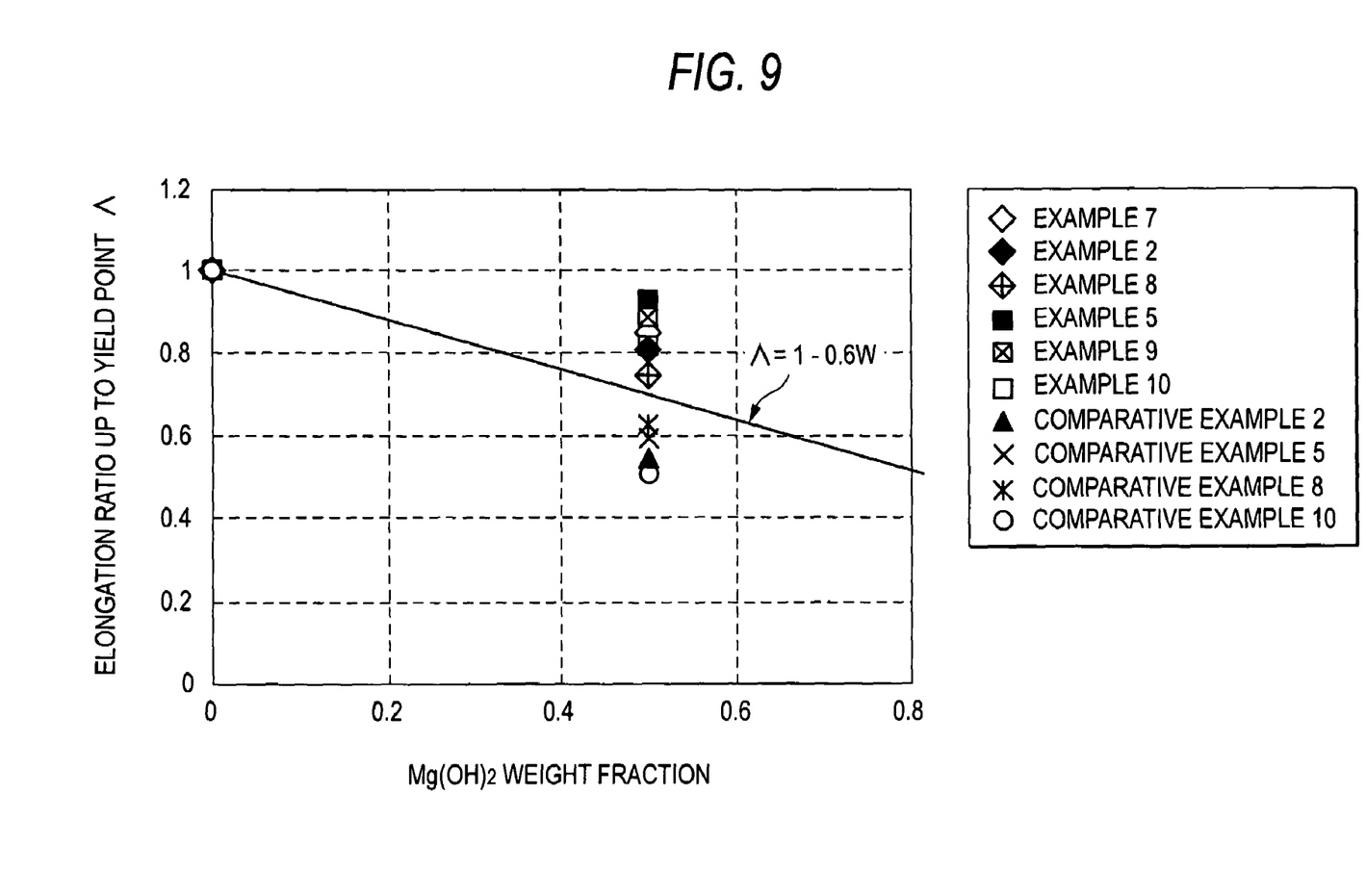
FIG. 9 is a graph illustrating the relationship between magnesium hydroxide weight fraction and abrasion resistance of insulated wires obtained in the examples and comparative examples.

FIG. 9 is a graph obtained by plotting the Λvalue vs. the weight fraction of magnesium hydroxide of the insulated wires prepared on trial basis (Examples 2, 5, 7, 8, 9 and 10, Comparative Examples 2, 5, 8 and 10). The results show that all these examples show a Λvalue that is above the straight line satisfying the equation (1).

Figure 10:
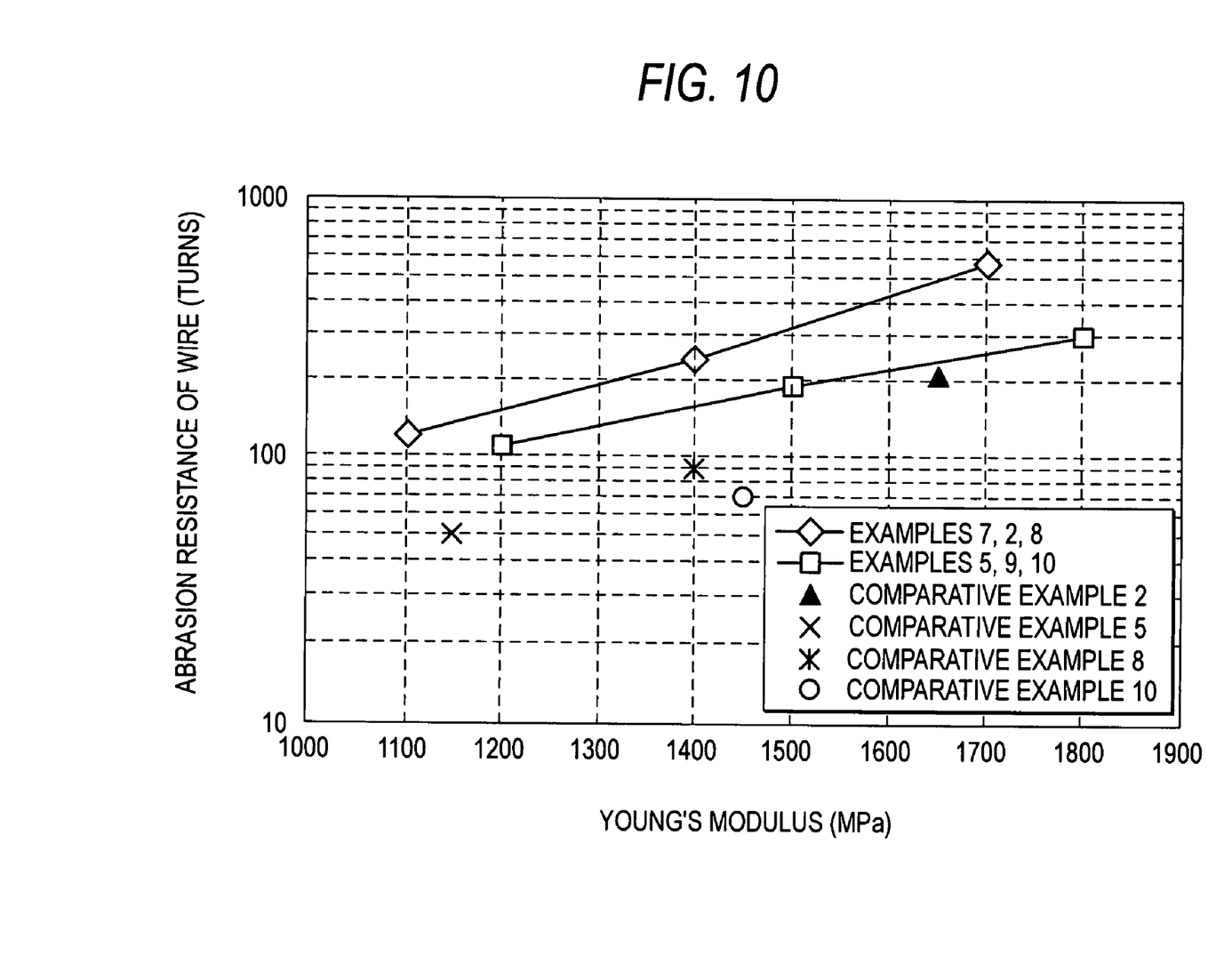
FIG. 10 is a graph illustrating the relationship between Young's modulus and abrasion resistance of insulated wires obtained in the examples and comparative examples.

Moreover, FIG. 10 is a graph obtained by plotting the abrasion resistance vs. the Young modulus of the various testing wires. The results show that the straight lines passing through the values of the examples are above the plots of the values of the comparative examples.

Accordingly, FIGS. 9 and 10 show that a wire comprising as an insulating material a fire retardant polypropylene-based resin composition satisfying the equation (1) is excellent in abrasion resistance as well as in tensile properties.

Further, as can be seen in Tables 5 and 6, all the testing wires of the various examples undergo neither cracking nor dielectric breakdown even at temperatures as extremely low as not higher than −40° C. and thus exhibit an excellent low temperature durability. On the contrary, the testing wire of Comparative Example 2 comprising a block polypropylene exhibits a remarkably deteriorated low temperature durability.

The present application is based on the Japanese patent application (Application No. JP2002-126133) filed on Apr. 26, 2002, and the contents thereof are included as a reference.

INDUSTRIAL APPLICABILITY

As mentioned above, in accordance with the invention, of an insulated wire for an automobile coated with an insulated material which is a fire retardant polypropylene-based resin composition excellent in abrasion resistance, tensile strength, tensile elongation, heat resistance, flexibility and low temperature durability can be obtained.

The invention claimed is:

1. An insulated wire for an automobile coated with an insulating material which is a fire retardant polypropylene-based resin composition, wherein the fire retardant polypropylene-based resin composition comprises a polypropylene-based resin and an inorganic fire retardant at a ratio of from 80 to 20% by weight and from 20 to 80% by weight, respectively, wherein the ratio $\Lambda(=\lambda/\lambda a)$ of the elongation percentage at a yield point $\lambda$ of the polypropylene-based resin in the resin composition to the elongation percentage at a tensile yield point $\lambda a$ of the polypropylene-based resin alone satisfies the following equation (1):

$$\Lambda = 1 - \alpha W \quad (1)$$

wherein α represents a number of 0.6 or less; and W is the weight fraction of the inorganic fire retardant, and wherein the polypropylene-based resin comprises:

a component (a-1) which is a propylene-α-olefin copolymer containing a xylene-soluble content of from 40% by weight to 80% by weight polymerized by a multistage polymerization method, and has a ηXs/ηXis ratio of 2.5 or less in which the ηXs and the ηXis are the intrinsic viscosity of a xylene-soluble content (Xs) and the intrinsic viscosity of a xylene-insoluble content (Xis), respectively, each measured with tetralin at 135° C.

a component (a-2) of a propylene homopolymer and/or a propylene-α-olefin random copolymer, and a component (a-3) of a propylene homopolymer and/or a propylene-α-olefin copolymer containing a carboxylic acid group or acid anhydride group in an amount of 0.5% by weight or more, wherein the total content of the component (a-1) and the component (a-2) is from 50 to 90% by weight and the content of the component (a-3) is from 10 to 50% by weight.

2. The insulated wire for an automobile according to claim 1, wherein the inorganic fire retardant is a metal oxide, metal hydroxide or metal carbonate having an average particle diameter of 20 μm or less.

3. The insulated wire for an automobile according to claim 1, wherein the inorganic fire retardant is a magnesium hydroxide or aluminum hydroxide having an average particle diameter of 20 μm or less.

4. The insulated wire according to claim 1, which has a low temperature durability of not higher than 40° C.

* * * * *